E. A. WALL.
NUT LOCK.
APPLICATION FILED FEB. 19, 1915.
1,151,632.
Patented Aug. 31, 1915.
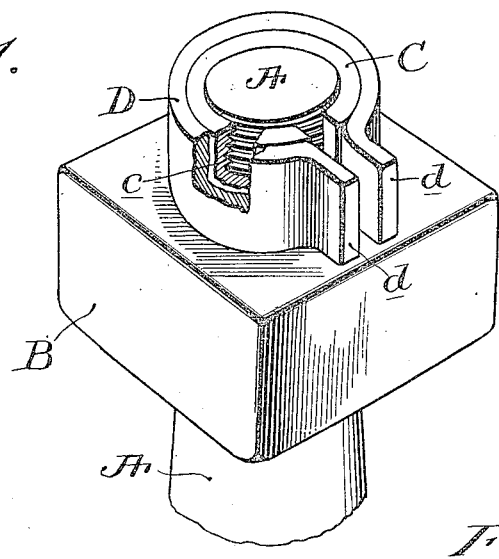
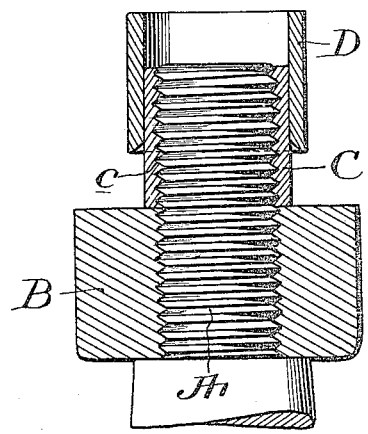
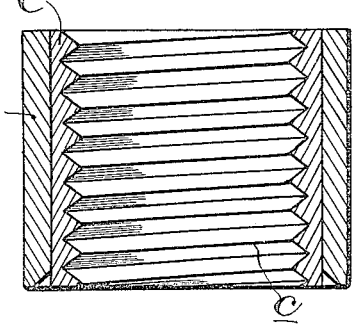
Witnesses
Inventor
E. A. Wall
Attorney

UNITED STATES PATENT OFFICE.

ENOS A. WALL, OF SALT LAKE CITY, UTAH.

NUT-LOCK.

1,151,632. Specification of Letters Patent. Patented Aug. 31, 1915.

Application filed February 19, 1915. Serial No. 9,370.

*To all whom it may concern:*

Be it known that I, ENOS A. WALL, a citizen of the United States, residing at Salt Lake City, in the county of Salt Lake and State of Utah, have invented certain new and useful Improvements in Nut-Locks, of which the following is a specification.

My invention relates to that class of nut locks in which an internally threaded split sleeve of spring material grasps the threaded end of the bolt at the outer side of the nut.

The object of the invention is to increase the locking action of the spring steel sleeve by providing an inner threaded friction surface of a material which will exert a greater frictional action upon the bolt threads than is possible with the threads cut directly in the spring steel sleeve. Such inner surface may be a soft metal or malleable metal sleeve like the bolt material or it may be of the fiber composition commonly employed in friction clutches and the like.

This object I accomplish by the construction shown in the accompanying drawing, in which:

Figure 1 is a sectional perspective of a bolt and nut with my improved nut lock in place. Fig. 2 is a longitudinal section thereof. Fig. 3 is a section through the locking sleeves removed.

A is a bolt and B a nut thereon. C designates a split sleeve provided with internal threads $c$ fitting the threads on bolt A. This sleeve C is formed of any suitable non-resilient material that will afford a firm frictional contact with the threads of bolt A; such material may be soft metal or any suitable composition, metallic or fibrous. The idea is to have the threaded sleeve make the best possible frictional locking contact with the bolt threads, which would not be the case with a threaded sleeve formed of spring steel as has been done heretofore. After the sleeve C has been turned by hand to bring it into contact with the nut the outer spring sleeve D is then driven upon the inner sleeve C and forced longitudinally thereof until it engages the nut to be locked.

The internal diameter or bore of the outer sleeve D, is somewhat smaller than the external diameter of the inner sleeve C, so that it will exert a constant gripping action on said sleeve C. The gripping or contracting force of this outer resilient sleeve will thus have the effect of constantly pressing the threads of the inner sleeve between the threads of the bolt, thus securing absolute contact of every portion of the sleeve threads with the threads of the bolt. The slots in the two sleeves allow of this contracting of the outer sleeve C about the inner sleeve and the consequent effective contact and gripping action of the threads of the inner sleeve upon those of the bolt. This operation is all the more effective by reason of the contact of the soft or malleable condition of the metal composing both the inner sleeve and the bolt; that is to say, the two softer metals being pressed together would have greater frictional resistance to the tendency of sleeve C to turn upon the bolt than if the sleeve consisted only of hard, resilient steel. It is, of course, obvious that the contact of the inner surface of the outer sleeve D with the outer surface of the inner sleeve C would render displacement of the sleeve D impossible, as both surfaces are plain and the gripping action and constant pressure of sleeve D would prevent its movement on sleeve C. In order to adapt the outer sleeve D to be readily forced over the inner sleeve C, the inner edge of the former will be slightly reamed out so as to permit it to be passed slightly over the end of sleeve C and it may then be driven along sleeve C by a hammer until it contacts with the nut. The outer sleeve D may have two lugs $d$ $d$ at its meeting edges by means of which it may be expanded by any suitable tool and placed upon the inner sleeve all the way or part of the way and then driven up to the nut.

The outer sleeve D could be similarly expanded when the sleeves are to be removed from the bolt.

What I claim is:

A nut lock comprising an inner longitudinally split sleeve of relatively soft material formed with internal threads whereby it may be screwed upon the threaded end of a bolt, and an outer longitudinally split sleeve formed of spring steel of an internal diameter to inclose the exterior of the inner sleeve, exert a clamping action thereon and force the previously formed screw threads of said inner sleeve into firm frictional contact with the bolt threads.

In testimony whereof I affix my signature in presence of two witnesses.

ENOS A. WALL.

Witnesses:
　GEO. W. PARKS,
　W. B. OLIVER.